(12) United States Patent
Ishikawa

(10) Patent No.: US 10,101,952 B2
(45) Date of Patent: Oct. 16, 2018

(54) DRIVER INSTALLATION SYSTEM

(71) Applicant: KYOCERA Document Solutions Inc., Osaka (JP)

(72) Inventor: Suguru Ishikawa, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/738,815

(22) PCT Filed: Aug. 17, 2016

(86) PCT No.: PCT/JP2016/073946
§ 371 (c)(1),
(2) Date: Dec. 21, 2017

(87) PCT Pub. No.: WO2017/051636
PCT Pub. Date: Mar. 30, 2017

(65) Prior Publication Data
US 2018/0181351 A1    Jun. 28, 2018

(30) Foreign Application Priority Data
Sep. 24, 2015 (JP) ................. 2015-187260

(51) Int. Cl.
*G06F 3/12* (2006.01)
*H04N 1/00* (2006.01)
*B41J 29/38* (2006.01)

(52) U.S. Cl.
CPC ............. *G06F 3/123* (2013.01); *B41J 29/38* (2013.01); *G06F 3/12* (2013.01); *G06F 3/1287* (2013.01);
(Continued)

(58) Field of Classification Search
CPC ...... G06F 3/123; G06F 3/1287; G06F 3/1288; G06F 3/12; H04N 1/00331;
(Continued)

(56) References Cited

U.S. PATENT DOCUMENTS

2003/0084132 A1    5/2003 Ohta
2008/0162941 A1*   7/2008 Tomita .................. G06F 21/608
                                          713/182
(Continued)

FOREIGN PATENT DOCUMENTS

JP           2003-131839 A      5/2003

*Primary Examiner* — Allen H Nguyen
(74) *Attorney, Agent, or Firm* — IP Business Solutions, LLC

(57) ABSTRACT

In a driver installation system, a client device includes: a device information display processing section acquiring, from a peripheral device via a server device, an image of a device information screen of the peripheral device targeted for driver installation and causing a display section to display the image; a selection acceptance section accepting selection of the device information screen from an operator; a device information reading section reading a device information from the selected device information screen; and a driver installation processing section receiving, from the server device, a driver installation file of the peripheral device indicated by the device information and install the driver of the peripheral device into the client device.

3 Claims, 6 Drawing Sheets

(52) U.S. Cl.
CPC ....... *G06F 3/1288* (2013.01); *H04N 1/00331* (2013.01); *H04N 1/00411* (2013.01); *H04N 1/00413* (2013.01); *H04N 1/00973* (2013.01)

(58) Field of Classification Search
CPC ........... H04N 1/00411; H04N 1/00413; H04N 1/00973; B41J 29/38
USPC ...................................................... 358/1.15
See application file for complete search history.

(56) References Cited

U.S. PATENT DOCUMENTS

| | | | |
|---|---|---|---|
| 2008/0174803 A1* | 7/2008 | Matsuba | H04N 1/00127 358/1.13 |
| 2009/0231615 A1* | 9/2009 | Itami | G06F 21/608 358/1.15 |
| 2012/0059916 A1* | 3/2012 | Ohashi | G06F 8/61 709/222 |
| 2013/0063771 A1* | 3/2013 | Song | H04N 1/32128 358/1.15 |
| 2015/0146241 A1* | 5/2015 | Lee | H04N 1/00103 358/1.15 |

* cited by examiner

Fig.3

| DEVICE INFORMATION | | | |
|---|---|---|---|
| MODEL | :TASK3510 | SERIAL NUMBER | :ZH23500000 |
| HOST NAME | :KKKKC054 | MAC ADDRESS | :00:C0:00:AF:C0:00 |
| DRIVER ID | :KYCD0001 | ASSET NUMBER | : |

IP ADDRESS
IPV4 : 10.181.00.00
IPV6 MANUAL :
　　　LINK LOCAL :
　　　STATELESS 1 :
　　　STATELESS 2 :
　　　STATELESS 3 :
　　　STATELESS 4 :
　　　STATELESS 5 :
　　　STATEFUL :

| IDENTIFICATION/ NET WORK | SOFTWARE VER./ CAPABILITY | OPTION | | ↵ CLOSE |

D

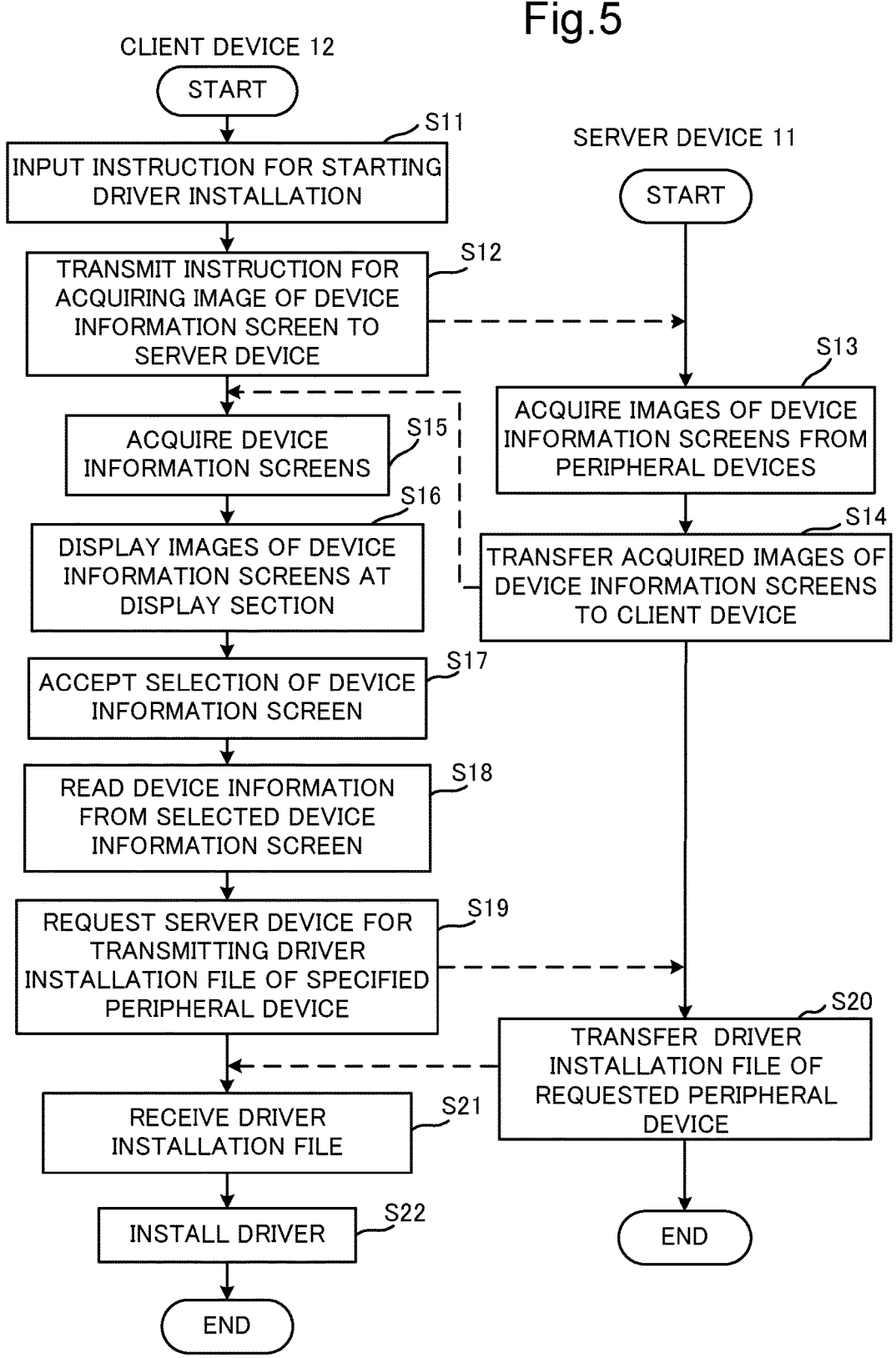

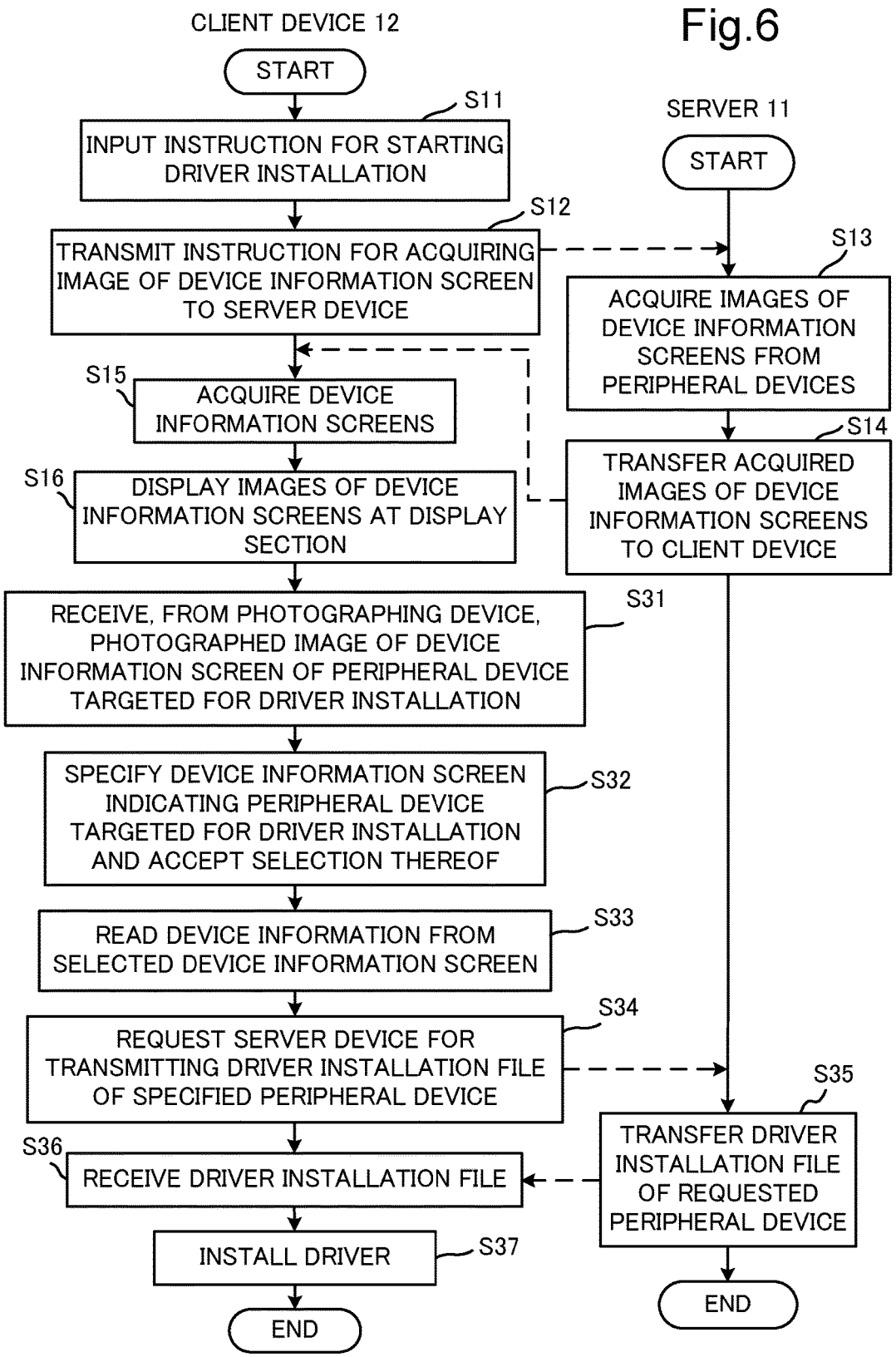

DRIVER INSTALLATION SYSTEM

TECHNICAL FIELD

The present invention relates to a driver installation system, and more specifically to a technology of installing a driver of a peripheral device into a client device in a system in which a server device, the client device, and a plurality of peripheral devices are connected to the network.

BACKGROUND ART

It is required to install a device driver (hereinafter simply referred to as a driver) into a PC in order to use a peripheral device on the PC. To install the driver of the peripheral device being on the network into the PC, the user needs to search for the target peripheral device from the network and further manually set various items such as an IP address, a MAC address, and a host name of the aforementioned peripheral device. Thus, the installation of the driver of the peripheral device on the network is complicated.

For the aforementioned problem, in Patent Document 1 below, installation configuration information of a driver, including information inputted when the driver has been installed once, can be saved in a server device, and an operator can select a virtual device on the server device to thereby automatically install the driver of a target peripheral device.

PRIOR ART LIST

Patent Document

[Patent Document 1] Japanese Patent Application Laid-open No. 2003-131839

SUMMARY OF THE INVENTION

With the invention disclosed in Patent Document 1 above, the operator is no longer required to input the various items upon the driver installation, making the driver installation easy. However, there is a risk of failure in proper installation of the driver of the target peripheral device as a result of erroneously selecting a different device upon the selection of the virtual device on the server device or selecting the device with old configuration information which has not been updated.

In view of the circumstance described above, the present invention has been made, and it is an object of the invention to enable easy and reliable installation of a driver of a peripheral device on the network into a client device.

A driver installation system according to one aspect of the present invention refers to a driver installation system having a server device, a client device, and a plurality of peripheral devices, all of which are connected to a network, wherein the server device includes: a device information image transfer section, in accordance with an instruction provided from the client device, acquiring, from each of all the peripheral devices provided on the network, an image of a device information screen on which device information specific to relevant one of the peripheral devices is displayed, and transferring the acquired images of the device information screens to the client device; a storage section saving driver installation files of the plurality of peripheral devices; and a driver transfer section reading, when transfer of the driver installation file of the peripheral device has been requested, the corresponding driver installation file from the storage section and transferring the driver installation file to the client device, and the client device includes: a display section; a device information screen acquisition section acquiring the image of the device information screen of each of the peripheral device from the server device; a device information display processing section causing the display section to display the images of the device information screens received by the device information screen acquisition section; a selection acceptance section accepting selection of the device information screen included in the device information screens displayed at the display section by the device information display processing section and indicating the peripheral device targeted for driver installation; a device information reading section analyzing the image of the device information screen accepted by the selection acceptance section to read the device information; and a driver installation processing section requesting the server device for transmitting the driver installation file of the peripheral device indicated by the device information read by the device information reading section, and executing the driver installation file transferred from the server device in accordance with the request to install the driver into the client device.

A driver installation system according to one aspect of the invention refers to a driver installation system having a server device and a client device, both of which are connected to a network, wherein the server device includes: a storage section saving driver installation files of a plurality of peripheral devices; and a driver transfer section, when transfer of the driver installation file of the peripheral device has been requested, reading the corresponding driver installation file from the storage section and transferring the driver installation file to the client device, and the client device includes: a display section; a photographed image reception section receiving, from another photographing device different from the client device, photographed images obtained by photographing device information screens displayed at display sections of the peripheral devices; a device information display processing section causing the display section to display the images of the device information screens received by the photographed image reception section; a selection acceptance section accepting selection of the device information screen included in the device information screens displayed at the display section by the device information display processing section and indicating the peripheral device targeted for driver installation; a device information reading section analyzing the image of the device information screen accepted by the selection acceptance section to read the device information; and a driver installation processing section requesting the server device for transmitting the driver installation file of the peripheral device indicated by the device information read by the device information reading section, and executing the driver installation file transferred from the server device to install the driver into the client device in accordance with the request.

Advantageous Effects of the Invention

With the present invention, it is possible to easily and reliably install a driver of a peripheral device on the network into a client device.

BRIEF DESCRIPTION OF THE DRAWINGS

FIG. 3 is a diagram illustrating one example of a device information screen of a peripheral device.

FIG. 5 is a processing flowchart of driver installation according to one example.

FIG. 6 is a processing flowchart of driver installation according to another example.

DESCRIPTION OF THE EMBODIMENTS

Figure 1:
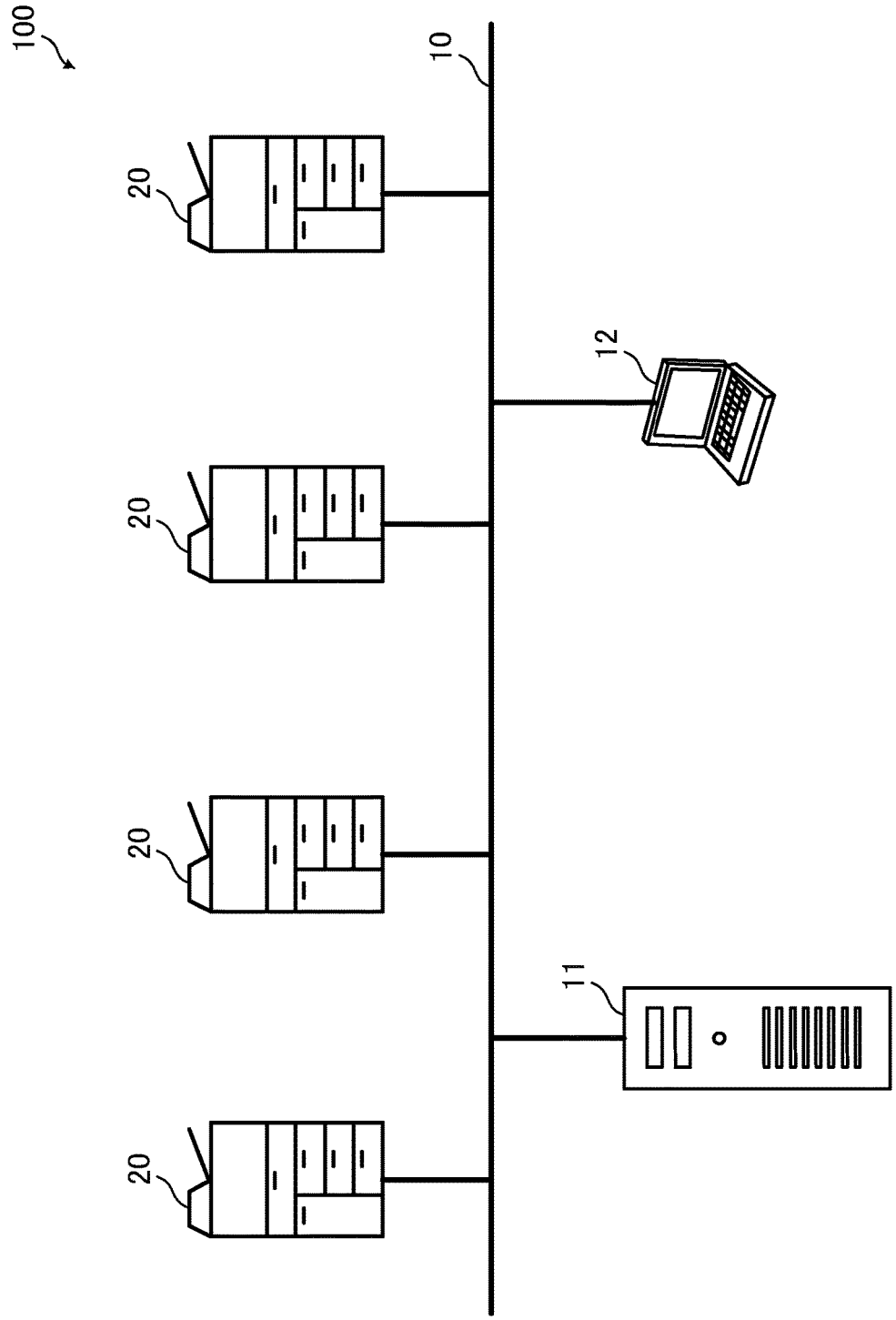
FIG. 1 is a configuration diagram of a driver installation system according to one embodiment of the present invention.

Hereinafter, a driver installation system according to one embodiment of the present invention will be described with reference to the drawings. FIG. 1 is a configuration diagram of the driver installation system according to one embodiment of the invention.

A driver installation system 100 according to one embodiment of the invention includes: a server device 11, a client device 12, and a plurality of peripheral devices 20. The server device 11, the client device 12, and the plurality of client devices 20 are connected to a network 10 and thus are capable of making communication with each other. Note that the client device 12 is, for example, a desktop PC, a laptop, or a tablet terminal. The peripheral device 20 is, for example, a printer, a facsimile device, a scanner device, or a multifunction peripheral. As described above, no limitation is put on the peripheral devices 20 and also no limitation is put on a type of a driver, but the embodiment below will be described, referring to a case where the peripheral device 20 is a multifunction peripheral and the driver is a printer driver.

Figure 2:
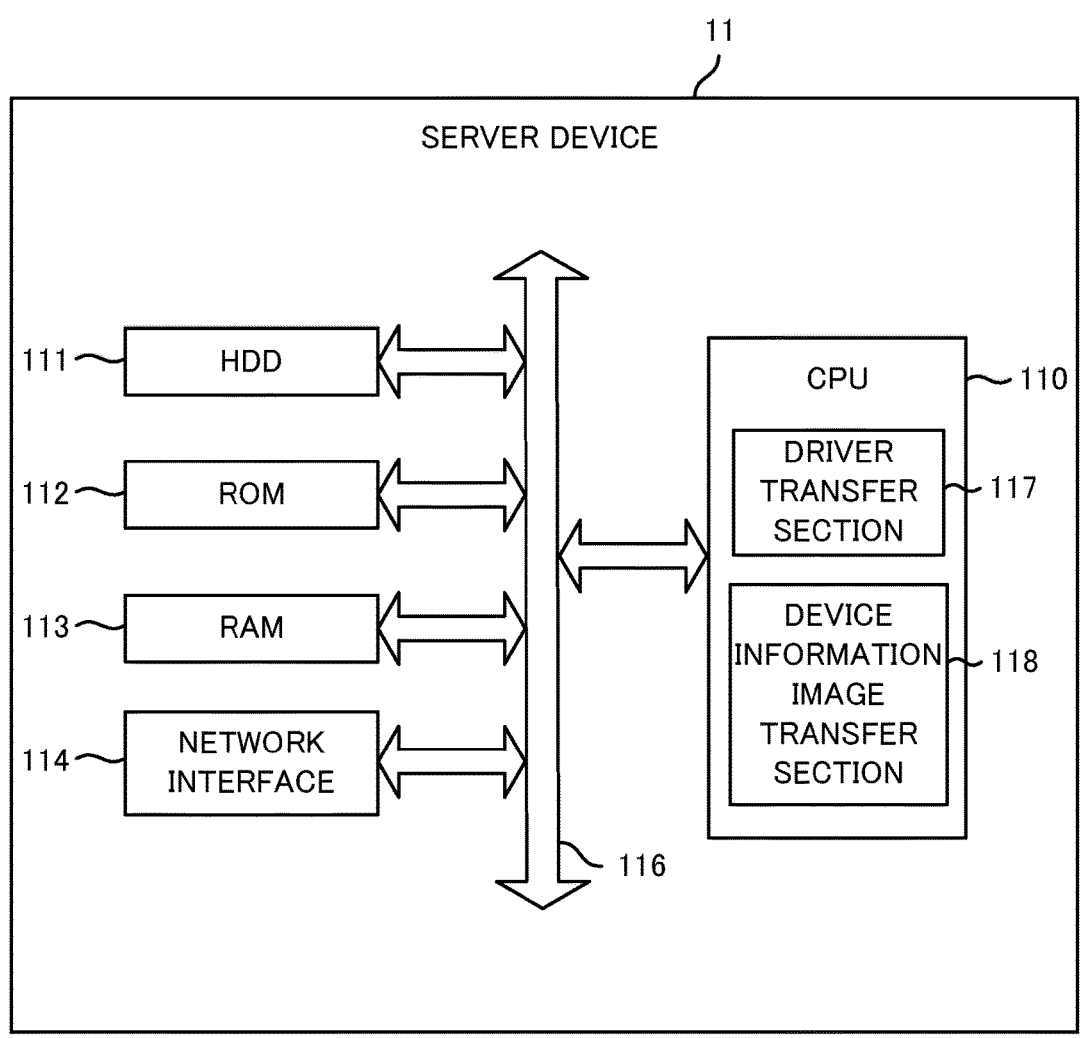
FIG. 2 is a functional block diagram of main sections of a server device.

FIG. 2 is a functional block diagram of main sections of the server device 11. The server device 11 includes: a CPU 110, a hard disc device (HDD) 111, a ROM 112, a RAM 113, and a network interface 114. Each of these elements are connected to each other by an inner bus 116.

The CPU 110 reads and executes a computer program (software) stored in the HDD 111 as appropriate, and performs overall operation control of the server device 11 through operation performed in accordance with the aforementioned computer program. In particular, the CPU 110 operates as a driver transfer section 117 and a device information image transfer section 118, to be described later on, through the operation performed in accordance with the aforementioned computer program.

The HDD 111 saves basic software and various pieces of application software executed by the CPU 110, a system file a data file, etc. The HDD 111 is one example of a storage section in the scope of the claims. The HDD 111 saves, for example, a driver installation file of the peripheral device 20 together with a driver ID specific to the driver installation file. The driver installation file is a file packaged with a file (with exe as an extension) in a format of execution used upon driver installation into the client device 12 and an installation configuration file (with iss as an extension). The driver installation files are prepared respectively corresponding to the peripheral devices 20. Further, for the single peripheral device 20, upon every version upgrade of the driver installation file, the HDD 111 additionally saves the version-upgraded driver installation file. That is, the HDD 111 saves each version of driver installation file for the single peripheral device 20. Each driver installation file is specified by a driver ID.

In the client device 12, it is possible to install the driver of the peripheral device 20 by executing the aforementioned driver installation file transferred from the server device 11.

The ROM 112 saves programs, such as BIOS, executed upon activation of the server device 11.

The RAM 113 functions as a work memory used upon execution of the basic software and the various pieces of application software by the CPU 110, and also temporarily saves data used by the various programs.

The network interface 114 is connected to the network 10 (FIG. 1), and performs communication between external devices, such as the client device 12 and the peripheral device 20, and the server device 11.

When requested by the client device 12 for installing the driver of the specific peripheral device 20, the driver transfer section 117 reads the driver installation file corresponding to the aforementioned peripheral device 20 from the HDD 111 and transfers the driver installation file to the client device 12.

The device information image transfer section 118 acquires, from the peripheral device 20 which is included in the peripheral devices 20 stored in correspondence with the aforementioned driver installation files and also for which the client device 12 has requested transfer of a device information screen, an image of the device information screen of the aforementioned peripheral device 20 and transfers the image to the client device 12. The device information screen is a screen which displays various pieces of device information, for example, an IP address, a MAC address, a host name (one example of identification information), and a driver ID serving as information specific to the peripheral device 20 for identifying the aforementioned peripheral device 20. In other words, the device information screen is included in each of the peripheral devices 20. Note that the device information specific to the peripheral device displayed on the device information screen is not limited to the aforementioned example, and, for example, only at least one of the IP address, the MAC address, the host name, and the driver ID is required to be displayed.

FIG. 3 is a diagram indicating one example of the device information screen D of the peripheral device 20. On the device information screen D, the IP address is displayed on an item "IP Address", the MAC address is displayed on an item "MAC Address", the host name is displayed on an item "Host Name", and the driver ID is displayed on an item "Driver ID". The device information screen D is saved in a predefined memory of the peripheral device 20, for example, a frame buffer (not illustrated). For example, it is configured that as a result of operating the peripheral device 20 by an operator, the peripheral device 20 displays the aforementioned device information screen D at a display section (not illustrated) thereof.

More specifically, the device information image transfer section 118 gets access to the plurality of peripheral devices 20 and acquires the device information screen D stored in the aforementioned predefined memory of each peripheral device 20. That is, the device information image transfer section 118 can acquire the device information screens D from the plurality of peripheral devices 20 without operator's direct operation of the peripheral devices 20.

Figure 4:
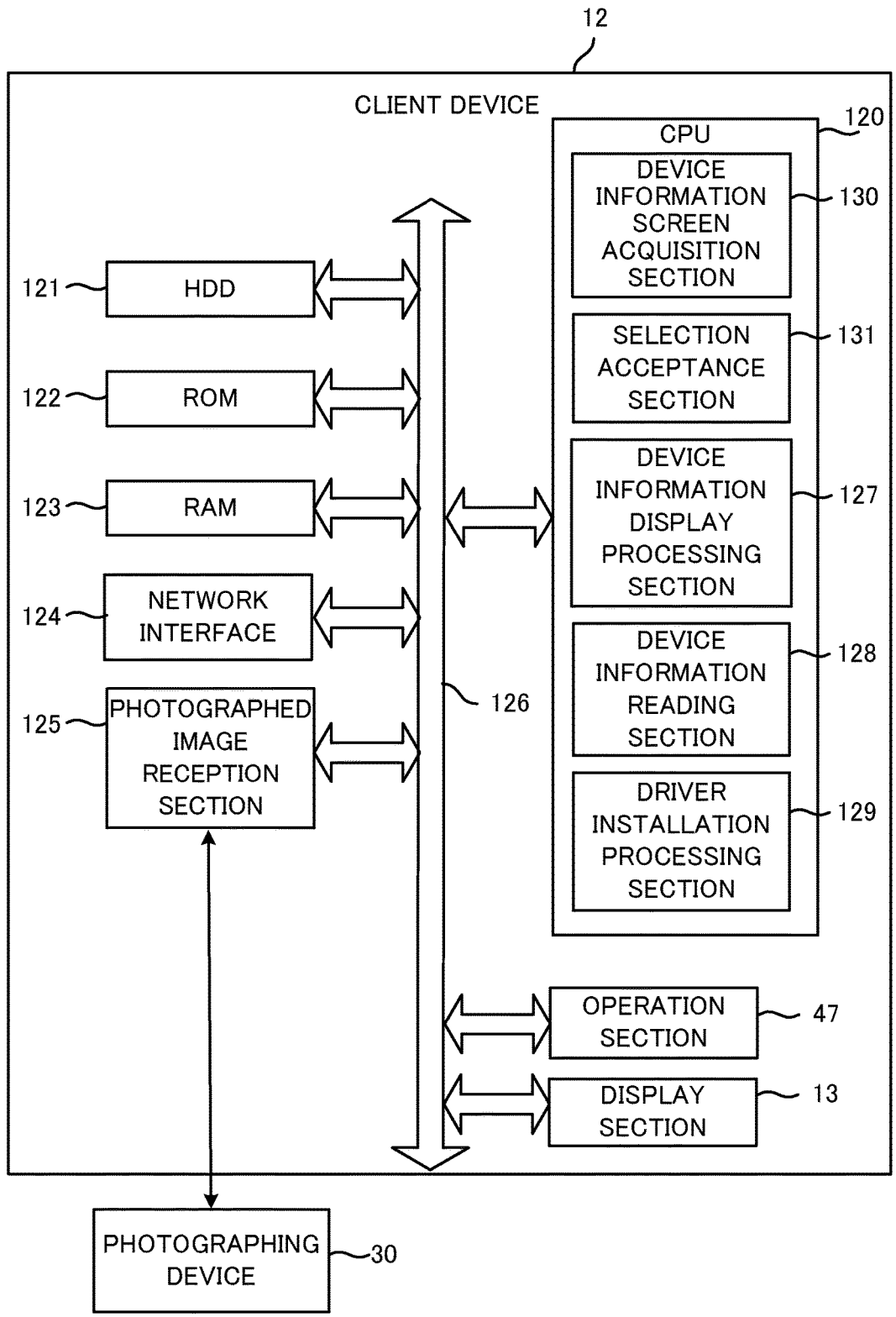
FIG. 4 is a functional block diagram of main sections of a client device.

FIG. 4 is a functional block diagram of main sections of the client device 12. The client device 12 includes: a CPU 120, a hard disc device (HDD) 121, a ROM 122, a RAM 123, a network interface 124, and a photographed image reception section 125. These elements are connected to each other by an inner bus 126.

The CPU 120 reads and executes a computer program (software) stored in the HDD 121 as appropriate, and performs overall operation control of the client device 12 through operation performed in accordance with the aforementioned computer program. In particular, the CPU 120 operates as a device information screen acquisition section 130, a device information display processing section 127, a selection acceptance section 131, a device information reading section 128, and a driver installation processing section 129, all of which are to be described later on, through operation performed in accordance with the aforementioned computer program.

The HDD 121 saves basic software and various pieces of application software executed by the CPU 120, a system file, a data file, etc. The HDD 121 saves, for example, drivers of the peripheral devices 20 installed into the client device 12. For example, in case of a WINDOWS (registered trademark) system, a driver file (with sys as an extension) is stored in C:¥WINDOWS¥system32¥drivers, and a system definition file (with inf as an extension) is stored in C:¥WINDOWS¥inf.

The ROM 122 saves programs, such as BIOS, which are executed upon activation of the client device 12.

The RAM 123 functions as a work memory used upon execution of the basic software and the various pieces of application software by the CPU 120, and also temporarily saves data used by the various programs.

The network interface 124 is connected to the network 10, and performs communication with the external devices such as the server device 11 and the peripheral device 20.

The photographed image reception section 125 receives, from a photographing device 30, an image photographed by the photographing device 30. The photographing device 30 is a terminal, for example, a smartphone or a tablet terminal, which has a camera function. Examples of the photographed image reception section 125 used include a USB interface and a BLUETOOTH (registered trademark) communication device. Alternatively, in case of a wireless LAN or a wired LAN, the photographed image can be received from the photographing device 30 via the network interface 124. In this case, the network interface 124 functions as the photographed image reception section 125 in the client device 12, and thus the photographed image reception section 125 does not have to be provided separately from the network interface 124.

The device information screen acquisition section 130 acquires, from the server device 11, for each of the plurality of peripheral devices 20, an image of the device information screen D on which device information specific to relevant one of the peripheral devices 20 is displayed. That is, the device information screen D is provided for each of the peripheral devices 20.

The device information display processing section 127 causes the display section 13 to display the images of the aforementioned device information screens D acquired by the device information screen acquisition section 130.

The selection acceptance section 131 accepts, based on operation of the operation section 47 performed by the operator, selection of the device information screen D which is included in the aforementioned device information screens D displayed at the display section 13 by the device information display processing section 127 and which indicates the peripheral device 20 targeted for driver installation.

The display section 13 is, for example, a liquid crystal monitor which is connected to the client device 12. In a case where the client device 12 is, for example, a laptop computer, the display section 13 is integrated with the client device 12.

The operation section 47 receives, from the operator, various instructions, such as an instruction for operation to be performed by the client device 12.

The selection acceptance section 131 may accept, instead of the aforementioned selection of the device information screen accepted through the operation of the operation section 47 performed by the operator, selection of the device information screen D in a following manner. For example, the operator operates the peripheral device 20 targeted for driver installation to cause a display section (not illustrated) of the aforementioned peripheral device 20 to display the device information screen D, and the aforementioned device information screen D is photographed by the photographing device 30. Then in a case where the photographed image reception section 125 of the client device 12 has received the photographed image obtained by photographing the aforementioned device information screen D from the photographing device 30, the selection acceptance section 131 compares the photographed image received by the photographed image reception section 125 with the images of the aforementioned device information screens D acquired by the device information screen acquisition section 130, specifies, out of the aforementioned device information screens D, the device information screen D which is close to the aforementioned photographed image, and accepts selection of this specified device information screen D as the device information screen D which indicates the peripheral device 20 targeted for the driver installation.

The device information reading section 128 analyzes the image of the device information screen D, the selection of which has been accepted by the selection acceptance section 131, to read the device information. For example, the device information reading section 128 recognizes a character included in the image of the device information screen D (for example, through an OCR function), and acquires, from the aforementioned device information screen D, the various pieces of device information such as the IP address, the MAC address, the host name, and the driver D of the peripheral device 20.

The driver installation processing section 129 requests the server device 11 for transmission of the peripheral device 20 and the driver installation file of the driver ID indicated by the device information read by the device information reading section 128, and executes the driver installation file transferred from the server device 11 in accordance with the aforementioned request to install the driver of the aforementioned peripheral device 20 into the client device 12.

Next, processing of installing, into the client device 12, the driver of the peripheral device 20 saved in the server device 11 in the driver installation system 100 will be described. FIG. 5 is a flowchart illustrating one example of the driver installation processing.

First, to install, into the client device 12, the driver of any of the peripheral devices 20 provided on the network 10, the operator operates the operation section 47 to input, into the client device 12, an instruction for starting the driver installation (S1).

When the aforementioned instruction for starting the driver installation has been inputted, the device information screen acquisition section 130 of the client device 12 transmits, to the server device 11, an instruction for acquiring the image of the device information screen D described above from each peripheral device 20 provided on the network 10 (S12).

Subsequently, upon receiving the aforementioned instruction from the client device 12 via the network interface 114, the device information image transfer section 118 of the server device 11 acquires the images of the respective device information screens D from all the peripheral devices 20 provided on the network 10 (S13). Then the device information image transfer section 118 transfers the acquired image of each device information screen D to the client device 12 (S14).

When the device information screen acquisition section 130 of the client device 12 has acquired the image of the device information screen D of each of the peripheral devices 20 described above from the server device 11 (S15), the device information display processing section 127 causes the display section 13 to display the image of each device information screens D described above (S16). Note that this display plays a role of notifying the operator of each peripheral device 20 the driver of which can be installed into the client device 12 at this point.

When the operator has operated the operation section 47 of the client device 12 to select, out of the device information screens D displayed at the display section 13, the device information screen D which indicates the peripheral device 20 the driver of which the operator desires to install, the aforementioned selection is accepted by the selection acceptance section 131 (S17).

The device information reading section 128 analyzes the image of the device information screen D, the selection of which has been accepted by the selection acceptance section 131, to read the device information (S18). This device information includes the device information such as the IP address, the MAC address, the host name, and the driver ID specific to the peripheral device 20 described above.

Subsequently, the driver installation processing section 129, based on the host name and the driver ID included in the device information read by the device information reading section 128, requests the server device 11 for transmission of the driver installation file which is related to the peripheral device 20 indicated by the aforementioned host name and also which is indicated by the aforementioned driver ID (S19).

Upon receiving the aforementioned request via the network interface 114, the driver transfer section 117 of the server device 11 reads, from the HDD 111 in accordance with the aforementioned request, the driver installation file which is related to the peripheral device 20 indicated by the aforementioned host name and also which is indicated by the aforementioned driver ID, and transfers the driver installation file to the client device 12 (S20).

Upon receiving, via the network interface 124, the aforementioned driver installation file transferred from the server device 11 (S21), the driver installation processing section 129 of the client device 12 executes this received driver installation file to install the driver into its own device (client device 12) (S22).

With this embodiment, the images of the device information screens D are acquired from the peripheral devices 20 via the server device 11 and the peripheral device 20 is specified based on the device information included in this device information screen, which therefore makes it possible to easily and reliably install the driver for the peripheral device provided on the network into the client device.

Moreover, with this embodiment, at a time point at which the instruction for starting the driver installation has been inputted into the client device 12 from the operator, the images of the device information screens D are acquired from the peripheral devices 20 via the server device 11, and the specification of the peripheral device 20 and the specification of the driver installation file used for the driver installation are performed based on the device information included in this device information screen, which therefore makes it possible to easily and reliably install, into the client device 12, the latest driver used in the aforementioned peripheral device 20. For example, even when a number of peripheral devices 20 provided on the network 10 is large, the different peripheral device is not erroneously selected and the driver with old configuration is not selected, which permits proper installation of a proper version of the driver of the target peripheral device 20.

Next, a second embodiment of the processing of installing, into the client device 12, the driver of the peripheral device 20 saved in the server device 11 in the driver installation system 100 will be described. FIG. 6 is a flowchart illustrating another embodiment of the driver installation processing. Note that of processes in the second embodiment illustrated in FIG. 6, the processes having the same step numbers as those illustrated in FIG. 5 are the same processes as those of the same step numbers in the first embodiment illustrated in FIG. 5.

Also in the second embodiment, when an instruction for starting driver installation is first inputted into the client device 12 by the operator, as is the case with the first embodiment (S11), the device information screen acquisition section 130 of the client device 12 transmits, to the server device 11, an instruction for acquiring, from each peripheral device 20 provided on the network 10, the image of the aforementioned device information screen D (S12). Upon receiving the aforementioned instruction from the client device 12, the server device 11 acquires the images of the respective device information screens D from all the peripheral devices 20 provided on the network 10 (S13), and transfers the acquired image of each device information screen D from the device information image transfer section 118 to the client device 12 (S14).

Upon acquiring the image of the device information screen D of each peripheral device 20 described above from the server device 11 (S15), the device information screen acquisition section 130 of the client device 12 temporarily stores the image of the device information screen D of each peripheral device 20 described above. The device information display processing section 127 causes the display section 13 to display the image of each device information screen D described above (S16). Note that this display plays a role of notifying the operator of each peripheral device 20 the driver of which can be installed at this point, but it is also possible not to perform this display.

Then the operator operates the peripheral device 20 the driver of which he or she wishes to install into the client device 12, and causes a display section (not illustrated) of the aforementioned peripheral device 20 to display the device information screen D. Then the display section of the peripheral device 20 the aforementioned device information screen D of which has been displayed is photographed by the photographing device 30. The operator operates the photographing device 30 to cause the aforementioned photographed image to be outputted from the photographing device 30 to the client device 12, and the photographed image reception section 125 of the client device 12 receives this photographed image from the photographing device 30 (S31).

When the photographed image reception section 125 has received the photographed image from the photographing device 30, the selection acceptance section 131 compares the photographed image received by the photographed image reception section 125 with the images of the aforementioned device information screens D acquired by the device information screen acquisition section 130 to specify, out of the aforementioned device information screens D, the device information screen D close to the aforementioned photographed image, and accepts selection of this specified device information screen D as the device information screen D which indicates the peripheral device 20 targeted for the driver installation (S32).

Hereinafter, processes S33 to S37 are performed in a same manner as S18 to S22 in the first embodiment.

With this second embodiment, out of the device information screens D acquired from the respective peripheral devices 20 via the server device 11 by the client device 12, the screen close to the device information screen D displayed at the display section of the peripheral device 20 photographed by the operator is provided as the aforementioned selected device information screen D which indicates the peripheral device 20 targeted for the driver installation, which therefore makes it possible to avoid erroneous selection of the peripheral device 20 attributable to erroneous operation by the operator and more reliably install, into the client device 12, the latest driver used in the aforementioned peripheral device 20.

Note that the second embodiment has been described above, under assumption that the driver installation system 100 includes the server device 11, the client device 12, and the plurality of peripheral devices 20, the server device 11 has the device information image transfer section 118, the client device 12 has the device information screen acquisition section 130, and the driver installation system 100 is capable of executing both the processing according to the first and second embodiments. As one embodiment of the present invention, the driver installation system 100 may execute not the processing according to the first embodiment but the processing according to the second embodiment, and the driver installation system 100 may include only the components required for executing the processing according to the second embodiment. In this case, the driver installation system 100 includes the server device 11 and the client device 12 without having the peripheral devices 20 as its components, the server device 11 does not include the device information image transfer section 118, and the client device 12 does not include the device information screen acquisition section 130.

Note that the configuration and the processing indicated by the aforementioned embodiments referring to FIGS. 1 to 6 are each just one embodiment of the invention, and the invention is not limited in any way to the aforementioned configuration and processing. The invention is not limited to the configuration of the aforementioned embodiments and various modifications thereto are permitted.

What is claimed is:

1. A driver installation system having a server device, a client device, and a plurality of peripheral devices, all of which are connected to a network, wherein the server device includes:
a device information image transfer section, in accordance with an instruction provided from the client device, acquiring, from each of all the peripheral devices provided on the network, an image of a device information screen on which device information specific to relevant one of the peripheral devices is displayed, and transferring the acquired images of the device information screens to the client device;
a storage section saving driver installation files of the plurality of peripheral devices; and
a driver transfer section reading, when transfer of the driver installation file of the peripheral device has been requested, the corresponding driver installation file from the storage section and transferring the driver installation file to the client device, and the client device includes:
a display section;
a device information screen acquisition section acquiring the image of the device information screen of each of the peripheral device from the server device;
a device information display processing section causing the display section to display the images of the device information screens received by the device information screen acquisition section;
a selection acceptance section accepting selection of the device information screen included in the device information screens displayed at the display section by the device information display processing section and indicating the peripheral device targeted for driver installation;
a device information reading section analyzing the image of the device information screen accepted by the selection acceptance section to read the device information;
a driver installation processing section requesting the server device for transmitting the driver installation file of the peripheral device indicated by the device information read by the device information reading section, and executing the driver installation file transferred from the server device to install the driver into the client device in accordance with the request; and
a photographed image reception section receiving, from another photographing device different from the client device, a photographed image obtained by photographing the device information screen displayed at the display section of the peripheral device, and the selection acceptance section compares the photographed image received by the photographed image reception section with the images of the device information screens, specifies the device information screen close to the photographed image, and accepts the specified device information screen as the device information screen indicating the peripheral device targeted for driver installation.

2. A driver installation system having a server device, a client device, and a plurality of peripheral devices, all of which are connected to a network, wherein the server device includes:
a device information image transfer section, in accordance with an instruction provided from the client device, acquiring, from each of all the peripheral devices provided on the network, an image of a device information screen on which device information specific to relevant one of the peripheral devices is displayed, and transferring the acquired images of the device information screens to the client device;
a storage section saving driver installation files of the plurality of peripheral devices; and
a driver transfer section reading, when transfer of the driver installation file of the peripheral device has been requested, the corresponding driver installation file from the storage section and transferring the driver installation file to the client device, and the client device includes:
a display section;
a device information screen acquisition section acquiring the image of the device information screen of each of the peripheral device from the server device;

a device information display processing section causing the display section to display the images of the device information screens received by the device information screen acquisition section;

a selection acceptance section accepting selection of the device information screen included in the device information screens displayed at the display section by the device information display processing section and indicating the peripheral device targeted for driver installation;

a device information reading section analyzing the image of the device information screen accepted by the selection acceptance section to read the device information; and a driver installation processing section requesting the server device for transmitting the driver installation file of the peripheral device indicated by the device information read by the device information reading section, and executing the driver installation file transferred from the server device to install the driver into the client device in accordance with the request, the device information included in the device information screen includes at least identification information for specifying the peripheral device and a driver ID for specifying the driver installation file, and the device information reading section of the client device analyzes the image of the device information screen accepted by the selection acceptance section, reads the identification information and the driver ID as the device information, and requests the server device for transmitting the driver installation file indicated by the driver ID for the peripheral device indicated by the identification information.

3. A driver installation system having a server device and a client device, both of which are connected to a network, wherein the server device includes:
a storage section saving driver installation files of a plurality of peripheral devices; and
a driver transfer section reading, when transfer of the driver installation file of the peripheral device has been requested, the corresponding driver installation file from the storage section and transferring the driver installation file to the client device, and the client device includes:
a display section;
a photographed image reception section receiving, from another photographing device different from the client device, photographed images obtained by photographing device information screens displayed at display sections of the peripheral devices;
a device information display processing section causing the display section to display the images of the device information screens received by the photographed image reception section;
a selection acceptance section accepting selection of a device information screen indicating the peripheral device targeted for driver installation among the device information screens displayed at the display section by the device information display processing section and;
a device information reading section analyzing the image of the device information screen accepted by the selection acceptance section to read the device information; and
a driver installation processing section requesting the server device for transmitting the driver installation file of the peripheral device indicated by the device information read by the device information reading section, and executing the driver installation file transferred from the server device to install the driver into the client device in accordance with the request.

* * * * *